United States Patent
Peng et al.

(10) Patent No.: US 10,996,447 B2
(45) Date of Patent: May 4, 2021

(54) PROJECTION LENS

(71) Applicant: AAC Acoustic Technologies (Shenzhen) Co., Ltd., Shenzhen (CN)

(72) Inventors: Haichao Peng, Shenzhen (CN); Chunhuan Fang, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 26 days.

(21) Appl. No.: 16/526,926

(22) Filed: Jul. 30, 2019

(65) Prior Publication Data
US 2020/0041771 A1 Feb. 6, 2020

(30) Foreign Application Priority Data
Aug. 3, 2018 (CN) .......................... 201810876491.4

(51) Int. Cl.
*G02B 13/00* (2006.01)
*G02B 13/16* (2006.01)
*G02B 7/02* (2021.01)

(52) U.S. Cl.
CPC ............. *G02B 13/16* (2013.01); *G02B 7/028* (2013.01); *G02B 13/0035* (2013.01)

(58) Field of Classification Search
CPC .... G02B 13/16; G02B 7/028; G02B 19/0057; G02B 19/0014; G02B 13/0035; G02B 13/18; G02B 1/00; G02B 1/041; G02B 9/14; G02B 9/16; G03B 21/14
See application file for complete search history.

(56) References Cited

U.S. PATENT DOCUMENTS

| | | | | | |
|---|---|---|---|---|---|
| 3,838,910 | A | * | 10/1974 | Ruben | ..................... G02B 13/00 359/790 |
| 2019/0154977 | A1 | * | 5/2019 | Tsai | ....................... G02B 13/16 |

* cited by examiner

*Primary Examiner* — Wen Huang
*Assistant Examiner* — Matthew Y Lee
(74) *Attorney, Agent, or Firm* — W&G Law Group LLP (57) ABSTRACT

A projection lens is disclosed. The projection lens includes, in sequence from an object side to an image side: an object surface, a first lens having positive refractive power, a second lens having negative refractive power, and a third lens having positive refractive power, where a focal length of the entire projection lens is f, a total optical length of the projection lens is TTL, a refractive index of the second lens is n2, a refractive index of the third lens is n3, and the following conditions are satisfied: $1.7 \le n2 \le 2.2$; $1.7 \le n3 \le 2.2$; and $1.25 \le f/TTL \le 2.20$. The projection lens can effectively reduce the system length, and has good performance stability at different temperatures.

6 Claims, 5 Drawing Sheets

PROJECTION LENS

TECHNICAL FIELD

The present disclosure relates to the field of optical lenses, more particular to a projection lens applicable to handheld terminal devices such as a smart phone and a digital camera, and the like.

BACKGROUND

With the rapid development of smart phones, innovative technologies for the camera functions of mobile phones are constantly emerging. For example, 3D imaging technology, which is an optical sensing technology based on 3D structured light, can be used for face and gesture recognition, enhancing camera functions, bringing new AR applications and transforming optical images from the past two-dimensional space to three-dimensional space, thereby bringing a more realistic and clear visual experience.

3D structured light refers to that after particular laser information is projected onto a surface of an object, the information is collected by a camera, and information about the position and depth of the object is calculated according to the change in optical information caused by the object, thereby restoring the entire three-dimensional space. Particular laser information is a very important indicator in the 3D structured light technology, and therefore high requirements are imposed on a projection lens for projecting laser information onto the surface of the object to be measured. Such a projection lens for projecting an array point light source emitted through a particular solid angle on the surface of a Vertical Cavity Surface Emitting Laser (VC-SEL) laser onto the surface of the object to be measured is a key factor for ensuring 3D imaging quality.

In existing projection lens products, the focal length f of the lens changes greatly as the ambient temperature changes, leading to a significant change in the angle at which light is projected from the lens. Consequently, the original optical information is changed, resulting in an error in the calculation of the entire system, and affecting the contour restoration precision of the three-dimensional object. In addition, the projected image point becomes larger as the ambient temperature changes, further leading to a decrease in the definition of the three-dimensional object restored by the system. A projection lens is provided in the present disclosure to effectively reduce the system length and improve the stability of the projection lens against ambient temperature changes.

DETAILED DESCRIPTION

To make the objectives, technical solutions, and advantages of the present disclosure clearer, the following further describes embodiments of the present disclosure in detail with reference to the accompanying drawings.

Embodiment 1

Figure 1:
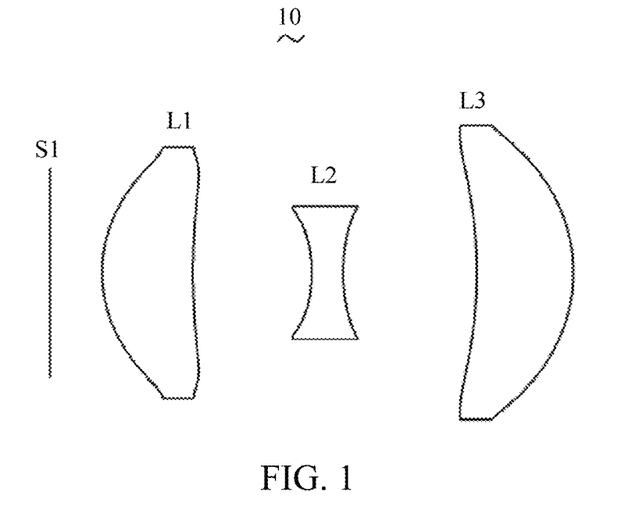
FIG. 1 is a schematic structural diagram of a projection lens according to embodiment 1 of the present disclosure.

Referring to the accompanying drawings, the embodiment 1 of present disclosure provides a projection lens 10. FIG. 1 shows the projection lens 10 according to the embodiment 1 of the present disclosure. The projection lens 10 includes three lenses. Specifically, the projection lens 10 includes, in sequence from an object side to an image side: an object surface S1, a first lens L1 having positive refractive power, a second lens L2 having negative refractive power, and a third lens L3 having positive refractive power.

The first lens L1 has positive refractive power, can effectively reduce the system length, and has an object-side which is a convex surface projecting outwardly and an image-side which is a concave surface. The second lens L2 has negative refractive power. In an embodiment, both an object-side and an image-side of the second lens L2 are concave surfaces. The third lens L3 has positive refractive power. In an embodiment, an object-side and an image-side of the third lens L3 are respectively a concave surface and a convex surface.

It is defined herein that a focal length of the entire projection lens 10 is f, a total optical length of the projection lens 10 is TTL, which is an on-axis distance from the object surface S1 to the image-side of the third lens L3, a refractive index of the second lens L2 is n2, a refractive index of the third lens L3 is n3, and f, TTL, n2, and n3 satisfy the following conditions: $1.7 \leq n2 \leq 2.2$; $1.7 \leq n3 \leq 2.2$; and $1.25 \leq f/TTL \leq 2.20$.

When the focal length f and the optical total length TTL of the projection lens 10 of the present disclosure, the refractive index n2 of the second lens, and the refractive index n3 of the third lens satisfy the foregoing conditions, the configuration of refractive power of the projection lens 10 can be controlled/adjusted, to effectively reduce the system length and reduce the space occupied by the system while achieving a clear projection. In addition, the second lens and the third lens are both made of a glass material to improve the stability of the system against the ambient temperature, and the change in the angle of projection is not significant, so that optical information is well maintained. Therefore, the system has better projection performance and is more suitable for portable high-power laser projection devices.

Specifically, in an embodiment of the present disclosure, a curvature radius R3 of the object-side of the second lens L2 and a curvature radius R4 of the image-side of the second lens L2 satisfy the following conditions: $-1.0 \leq (R3+R4)/(R3-R4) \leq -0.1$. By means of this design, the shape of the second lens L2 is set, so that system aberrations of the projection lens can be effectively corrected.

Preferably, the focal length f of the projection lens 10 in an embodiment of the present disclosure and a focal length f1 of the first lens L1 satisfy the following conditions: $0.30 \leq f1/f \leq 0.41$. By means of this design, the system aberrations of the projection lens can be effectively corrected, thereby achieving an ultra-thin stricture of the system.

Preferably, the focal length f of the projection lens 10 and a focal length f2 of the second lens L2 satisfy the following conditions: −0.2≤f2/f≤0. By means of this design, the system aberrations of the projection lens can be further corrected.

Preferably, an on-axis distance d4 from the image-side of the second lens L2 to the object-side of the third lens L3 and an on-axis thickness d5 of the third lens L3 satisfy the following conditions: 1.1≤d4/d5≤2.0. By means of this design, the positions and on-axis thicknesses of the lenses are properly set to facilitate processing and assembly of the projection lens 10.

Preferably, a curvature radius R5 of the object-side of the third lens L3 and a curvature radius R6 of the image-side of the third lens L3 satisfy the following conditions: 1.7≤(R5+R6)/(R5−R6)≤2.5. By means of this design, the shape of the third lens L3 is set to help correct the system aberrations of the projection lens.

Specifically, the first lens L1 is made of plastic, the second lens L2 is made of glass, and the third lens L3 is made of glass. Because glass has a high refractive index and good light permeability, the optical performance of the projection lens 10 can be effectively improved. In addition, because glass has good thermal stability, the optical system has good performance stability at different temperatures.

In addition, a surface of the lens can be set to be an aspheric surface, and the aspheric surface can be easily fabricated into a shape other than a spherical surface to obtain more control variables for reducing aberrations, thereby reducing the quantity of lenses used. Therefore, the total length of the projection lens of the present disclosure can be effectively reduced. In an embodiment of the present disclosure, the object-side and the image-side of each lens are all aspheric.

Preferably, an inflection point and/or a stationary point may be further disposed on the object-side and/or the image-side of the lens, to meet the requirement for high-quality imaging. Specific implementation solutions are described below.

The following shows design data of the projection lens 10 according to an embodiment of the present disclosure. Symbols described in this embodiment are described as follows. The focal length, the on-axis distance, the curvature radius, the on-axis thickness, the position of the inflection point, and the position of the stationary point are measured in mm. Table 1 and Table 2 show data of the projection lens 10 in an embodiment of the present disclosure.

TABLE 1

| Focal length (mm) | |
|---|---|
| f | 4.5914 |
| f1 | 1.4705 |
| f2 | −0.6156 |
| f3 | 1.6656 |

Meanings of the symbols are as follows:

f: focal length of projection lens 10;

f1: focal length of first lens L1;

f2: focal length of second lens L2; and f3: focal length of third lens L3.

TABLE 2

| | | Curvature radius (R) (mm) | Thickness/ distance (d) (mm) | | Refractive index (nd) | | Abbe number (vd) | |
|---|---|---|---|---|---|---|---|---|
| S1 | | ∞ | d0 = | 0.300 | | | | |
| L1 | R1 | 0.771302 | d1 = | 0.520 | nd1 | 1.6614 | v1 | 20.41 |
| | R2 | 3.307817 | d2 = | 0.681 | | | | |
| L2 | R3 | −0.82704 | d3 = | 0.180 | nd2 | 1.7555 | v2 | 45.66 |
| | R4 | 1.107733 | d4 = | 0.765 | | | | |
| L3 | R5 | −2.66174 | d5 = | 0.554 | nd3 | 1.7555 | v3 | 45.66 |
| | R6 | −0.91684 | d6 = | 399.64 | | | | |

Meanings of the symbols are as follows:

R: curvature radius of optical surface; center curvature radius in the case of a lens;

R1: curvature radius of object-side of first lens L1;

R2: curvature radius of image-side of first lens L1;

R3: curvature radius of object-side of second lens L2;

R4: curvature radius of image-side of second lens L2;

R5: curvature radius of object-side of third lens L3;

R6: curvature radius of image-side of third lens L3:

d: on-axis thickness of lens; on-axis distance between lenses;

d0: on-axis distance from object surface S1 of the projection lens to object-side of first lens L1;

d1: on-axis thickness of first lens L1;

d2: on-axis distance from image-side of first lens L1 to object-side of second lens L2:

d3: on-axis thickness of second lens L2;

d4: on-axis distance from image-side of second lens L2 to object-side of third lens L3;

d5: on-axis thickness of third lens L3;

d6: on-axis distance from image-side of third lens L3 to image surface of the projection lens;

nd: refractive index at D line nd1: refractive index of first lens L1;

nd2: refractive index of second lens L2;

nd3: refractive index of third lens L3;

vd: Abbe number v1: Abbe number of first lens L1;

v2: Abbe number of second lens L2; and v3: Abbe number of third lens L3.

Table 3 shows data of aspheric surfaces of the lenses of the projection lens 10 in an embodiment of the present disclosure.

TABLE 3

| | Conic coefficient | Aspheric coefficient | | | | | | |
|---|---|---|---|---|---|---|---|---|
| | K | A4 | A6 | A8 | A10 | A12 | A14 | A16 |
| R1 | −3.5719E+00 | 8.1360E−01 | −3.4019E−01 | −7.3706E+00 | 5.4145E+01 | −1.7752E+02 | 2.9173E+02 | −2.0123E+02 |
| R2 | 2.0134E+01 | −4.2185E−01 | 3.8325E+00 | −2.9554E+01 | 1.2998E+02 | −3.3950E+02 | 4.5261E+02 | −2.4287E+02 |

TABLE 3-continued

| | Conic coefficient | Aspheric coefficient | | | | | | |
|---|---|---|---|---|---|---|---|---|
| | K | A4 | A6 | A8 | A10 | A12 | A14 | A16 |
| R3 | −2.1521E+01 | −6.1162E+00 | 6.4612E+01 | −9.7128E+02 | 1.1669E+04 | −9.5547E+04 | 4.0829E+05 | −5.7878E+05 |
| R4 | 2.0396E+00 | 6.9299E−02 | 1.2612E+01 | −2.9316E+02 | 5.4924E+03 | −5.9735E+04 | 3.3542E+05 | −7.5371E+05 |
| R5 | −8.5960E+00 | −7.2655E−02 | 3.4101E−02 | −5.4827E−02 | 1.4854E+00 | −5.8489E+00 | 1.0452E+01 | −6.2830E+00 |
| R6 | −2.8242E−01 | −1.0843E−02 | −1.3240E−01 | 1.0300E+00 | −4.6655E+00 | 1.1432E+01 | −1.4442E+01 | 7.5454E+00 |

K is a conic coefficient A4, A6, A8, A10, A12, A14, and A16 are aspheric coefficients.

IH: image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

For convenience, aspheric surfaces shown in the foregoing formula (1) are used as the aspheric surfaces of the lenses. However, the present disclosure is not limited to the aspheric surface polynomial form shown in the formula (1).

Table 4 and Table 5 show design data of inflection points and stationary points of the lenses in the projection lens 10 in an embodiment of the present disclosure. R1 and R2 respectively represent the object-side and the image-side of the first lens L1, R3 and R4 respectively represent the object-side and the image-side of the second lens L2, and R5 and R6 respectively represent the object-side and the image-side of the third lens L3. Corresponding data in the column "Inflection point position" is a vertical distance from an inflection point set on the surface of each lens to an optical axis of the projection lens 10, and corresponding data in the column "Stationary point position" is a vertical distance from a stationary point set on the surface of each lens to the optical axis of the projection lens 10.

TABLE 4

| | Quantity of inflection points | Inflection point position 1 |
|---|---|---|
| R1 | 1 | 0.625 |
| R2 | 1 | 0.425 |
| R3 | 1 | 0.345 |
| R4 | 1 | 0.375 |
| R5 | 1 | 0.605 |
| R6 | 1 | 0.795 |

TABLE 5

| | Quantity of stationary points | Stationary point position 1 |
|---|---|---|
| R1 | | |
| R2 | 1 | 0.565 |
| R3 | | |
| R4 | | |
| R5 | | |
| R6 | | |

Figure 2:
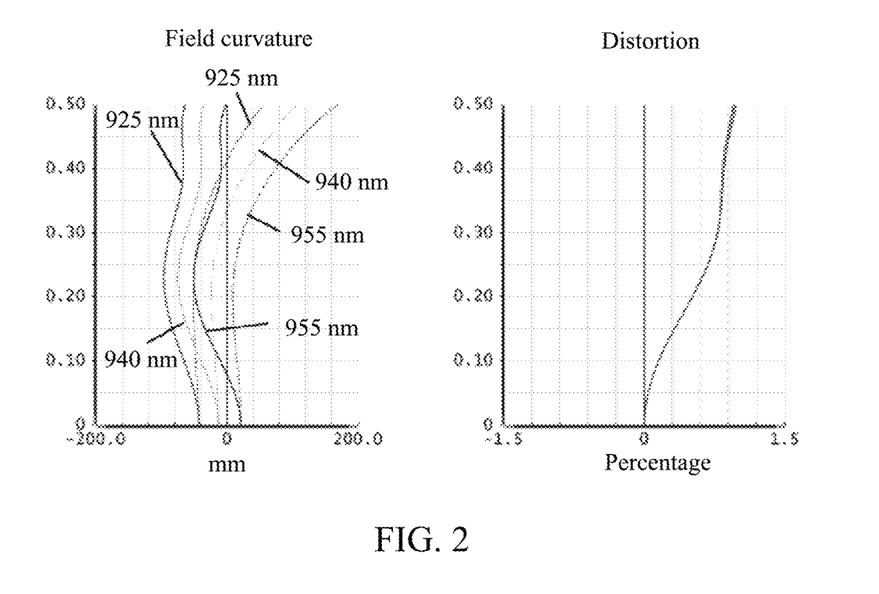
FIG. 2 is a schematic diagram of a field curvature and distortion of the projection lens shown in FIG. 1.

FIG. 2 is a schematic diagram of field curvatures and distortions obtained alter light having wavelengths of 925 nm, 940 nm and 955 nm pass through the imaging optical lens 10 in the embodiment 1.

Figure 3:
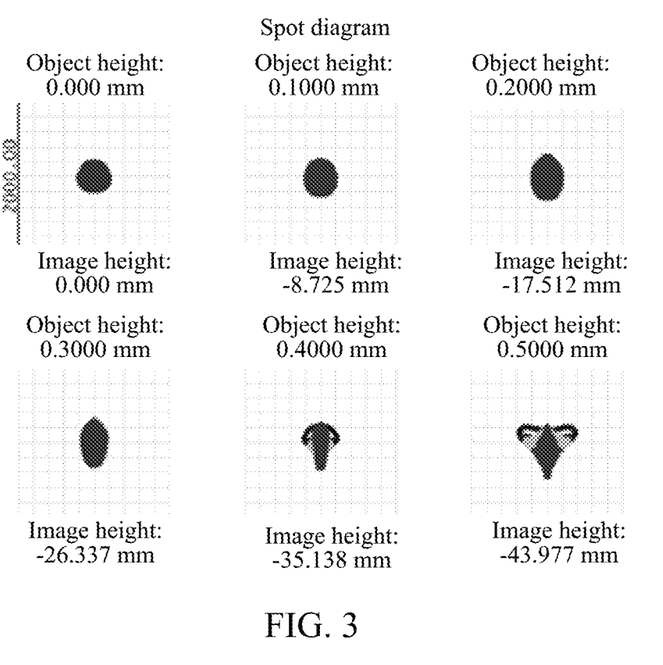
FIG. 3 is a spot diagram of the projection lens shown in FIG. 1.

FIG. 3 is a spot diagram of the projection lens 10 in the embodiment 1.

Table 6 below lists values corresponding to the conditions in an embodiment based on the foregoing conditions. Apparently, the projection lens 10 in the embodiment satisfies the foregoing conditions.

TABLE 6

| Condition | First embodiment |
|---|---|
| 1.7 ≤ n2 ≤ 2.2 | 1.7555 |
| 1.7 ≤ n3 ≤ 2.2 | 1.7555 |
| 1.25 ≤ f/TTL ≤ 2.2 | 1.53 |
| −1 ≤ (R3 + R4)/(R3 − R4) ≤ −0.1 | −0.15 |
| 0.3 ≤ f1/f ≤ 0.41 | 0.32 |
| −0.2 ≤ f2/f ≤ 0 | −0.13 |
| 1.1 ≤ d4/d5 ≤ 2 | 1.38 |
| 1.7 ≤ R5 + R6)/(R5 − R6) ≤ 2.5 | 2.05 |

In an embodiment, a full-field image height is 0.5 mm, and a working distance is 399.64 mm.

Embodiment 2

Figure 4:
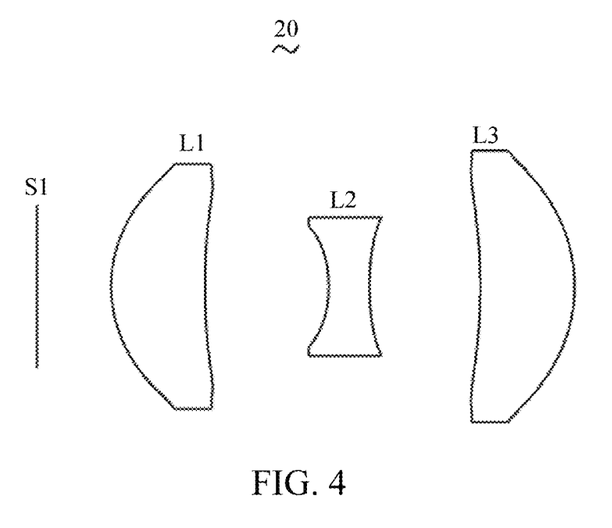
FIG. 4 is a schematic structural diagram of a projection lens according to embodiment 2 of the present disclosure.

FIG. 4 shows a projection lens 20 according to the embodiment 2 of the present disclosure. The configuration of lenses of the projection lens 20 in the embodiment 2 is basically the same as that of the projection lens 10 in the first embodiment, and only differences are listed below. The following shows design data of the projection lens 20 according to the embodiment 2 of the present disclosure.

Table 7 and Table 8 show data of the projection lens 20 in an embodiment of the present disclosure.

TABLE 7

| Focal length (mm) | |
|---|---|
| f | 4.4716 |
| f1 | 1.5893 |
| f2 | −0.6723 |
| f3 | 1.6481 |

TABLE 8

| | | Curvature radius (R) (mm) | Thickness/ distance (d) (mm) | | Refractive index (nd) | Abbe number (vd) |
|---|---|---|---|---|---|---|
| S1 | | ∞ | d0 = | 0.450 | | |
| L1 | R1 | 0.840424 | d1 = | 0.566 | nd1 1.6614 | v1 20.41 |
| | R2 | 3.753803 | d2 = | 0.749 | | |
| L2 | R3 | −0.76958 | d3 = | 0.245 | nd2 1.7555 | v2 45.66 |
| | R4 | 1.597125 | d4 = | 0.670 | | |
| L3 | R5 | −3.43374 | d5 = | 0.570 | nd3 1.7555 | v3 45.66 |
| | R6 | −0.96333 | d6 = | 399.64 | | |

Table 9 shows data of aspheric surfaces of the lenses of the projection lens 20 in an embodiment of the present disclosure.

TABLE 9

| | Conic coefficient | Aspheric coefficient | | | | | | |
|---|---|---|---|---|---|---|---|---|
| | K | A4 | A6 | A8 | A10 | A12 | A14 | A16 |
| R1 | −3.8536E+00 | 8.8270E−01 | −1.3483E+00 | −1.6544E+00 | 2.8235E+01 | −9.5399E+01 | 1.4856E+02 | −9.4570E+01 |
| R2 | 2.8006E+01 | −3.7555E−02 | 7.5176E−01 | −1.2964E+01 | 8.2863E+01 | −2.6182E+02 | 3.8743E+02 | −2.2831E+02 |
| R3 | −1.5916E+01 | −5.4554E+00 | 3.3977E+01 | 4.7973E+01 | −9.9240E+03 | 1.6934E+05 | −1.2527E+06 | 3.4662E+06 |
| R4 | 4.8551E+00 | −1.4772E−01 | 5.9549E+00 | −1.4205E+01 | −9.8810E+02 | 1.7467E+04 | −1.1348E+05 | 2.5827E+05 |
| R5 | −1.5456E+01 | −4.9533E−02 | 7.7808E−02 | −4.5691E−01 | 3.7734E+00 | −1.0370E+01 | 1.4689E+01 | −8.0578E+00 |
| R6 | −2.8443E−01 | −5.2200E−03 | −1.7555E−01 | 1.3544E+00 | −5.7844E+00 | 1.3717E+01 | −1.6713E+01 | 8.6155E+00 |

Table 10 and Table 11 show design data of inflection points and stationary points of the lenses in the projection lens 20 in an embodiment of the present disclosure.

TABLE 10

| | Quantity of inflection points | Inflection point position 1 | Inflection point position 2 |
|---|---|---|---|
| R1 | 1 | 0.675 | |
| R2 | 2 | 0.505 | 0.675 |
| R3 | 1 | 0.355 | |
| R4 | | | |
| R5 | 1 | 0.525 | |
| R6 | 1 | 0.765 | |

TABLE 11

| | Quantity of stationary points | Stationary point position 1 | Stationary point position 2 |
|---|---|---|---|
| R1 | | | |
| R2 | 2 | 0.615 | 0.685 |
| R3 | | | |
| R4 | | | |
| R5 | 1 | 0.705 | |
| R6 | | | |

Figure 5:
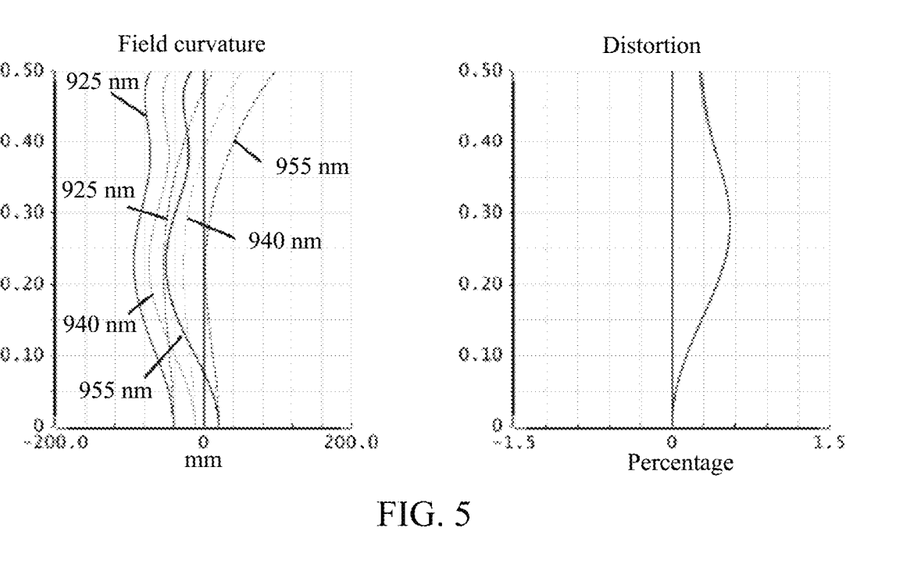
FIG. 5 is a schematic diagram of a field curvature and distortion of the projection lens shown in FIG. 4.

FIG. 5 is a schematic diagram of field curvatures and distortions obtained after light having wavelengths of 925 nm, 940 nm and 955 nm pass through the projection lens 20 in an embodiment.

Figure 6:
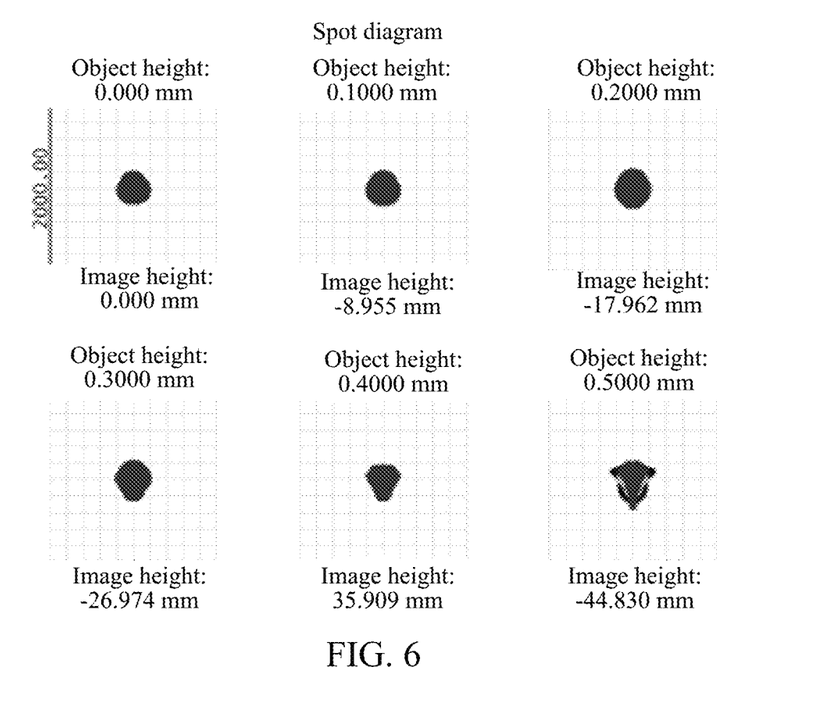
FIG. 6 is a spot diagram of the projection lens shown in FIG. 4.

FIG. 6 is a spot diagram of the projection lens 20 in the embodiment 2.

Table 12 below lists values corresponding to the conditions in embodiment 2 based on the foregoing conditions. Apparently, the projection lens 20 in the embodiment satisfies the foregoing conditions.

TABLE 12

| Condition | Embodiment 2 |
|---|---|
| 1.7 ≤ n2 ≤ 2.2 | 1.7555 |
| 1.7 ≤ n3 ≤ 2.2 | 1.7555 |
| 1.25 ≤ f/TTL ≤ 2.2 | 1.38 |
| −1 ≤ (R3 + R4)/(R3 − R4) ≤ −0.1 | −0.35 |
| 0.3 ≤ f1/f ≤ 0.41 | 0.36 |

TABLE 12-continued

| Condition | Embodiment 2 |
|---|---|
| −0.2 ≤ f2/f ≤ 0 | −0.15 |
| 1.1 ≤ d4/d5 ≤ 2 | 1.18 |
| 1.7 ≤ (R5 + R6)/(R5 − R6) ≤ 2.5 | 1.78 |

In the embodiment, a full-field image height is 0.5 mm, and a working distance is 399.64 mm.

Embodiment 3

Figure 7:
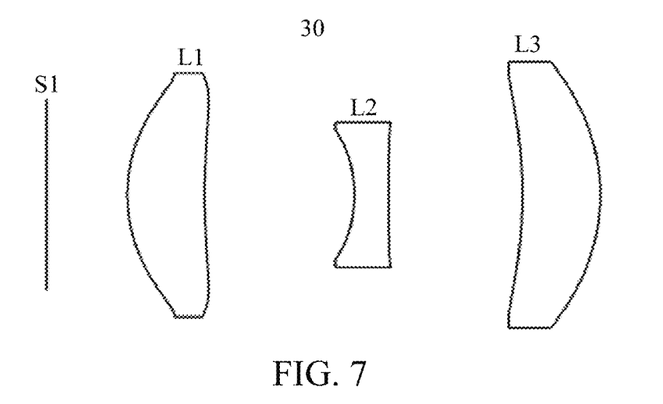
FIG. 7 is a schematic structural diagram of a projection lens according to embodiment 3 of the present disclosure.

FIG. 7 shows a projection lens 30 according to the embodiment 3 of the present disclosure. The configuration of lenses of the projection lens 30 in the embodiment 3 is basically the same as that of the projection lens 10 in the embodiment 1, and only differences are listed below. The following shows design data of the projection lens 30 according to the embodiment 3 of the present disclosure.

Table 13 and Table 14 show data of the projection lens 30 in an embodiment of the present disclosure.

TABLE 13

| Focal length (mm) | |
|---|---|
| f | 4.4799 |
| f1 | 1.8310 |
| f2 | −0.9140 |
| f3 | 1.9135 |

TABLE 14

| | | Curvature radius (R) (mm) | Thickness/ distance (d) (mm) | Refractive index (nd) | | Abbe number (vd) | |
|---|---|---|---|---|---|---|---|
| S1 | | ∞ | d0 = 0.506 | | | | |
| L1 | R1 | 0.962418 | d1 = 0.484 | nd1 | 1.6614 | v1 | 20.41 |
| | R2 | 4.433624 | d2 = 0.936 | | | | |
| L2 | R3 | −0.96607 | d3 = 0.216 | nd2 | 2.0050 | v2 | 21.00 |
| | R4 | 11.10019 | d4 = 0.836 | | | | |
| L3 | R5 | −2.96312 | d5 = 0.488 | nd3 | 2.0050 | v3 | 21.00 |
| | R6 | −1.22862 | d6 = 399.744 | | | | |

Table 15 shows data of aspheric surfaces of the lenses of the projection lens 30 in an embodiment of the present disclosure.

TABLE 15

| | Conic coefficient | Aspheric coefficient | | | | | | |
|---|---|---|---|---|---|---|---|---|
| | K | A4 | A6 | A8 | A10 | A12 | A14 | A16 |
| R1 | −5.3022E+00 | 7.0854E−01 | −9.3961E−01 | −1.2096E+00 | 1.2898E+01 | −3.4832E+01 | 4.5418E+01 | −2.7500E+01 |
| R2 | 3.2459E+01 | −1.3635E−01 | 4.7740E−01 | −7.0429E+00 | 3.6605E+01 | −9.6541E+01 | 1.2050E+02 | −5.9888E+01 |

TABLE 15-continued

| | Conic coefficient | Aspheric coefficient | | | | | | |
|---|---|---|---|---|---|---|---|---|
| | K | A4 | A6 | A8 | A10 | A12 | A14 | A16 |
| R3 | −1.8394E+01 | −3.7623E+00 | 1.9675E+01 | 2.1081E+01 | −4.3275E+03 | 6.2773E+04 | −3.8771E+05 | 8.9565E+05 |
| R4 | −8.9439E+01 | −4.2017E−01 | 5.1486E+00 | −1.5594E+01 | −4.2869E+02 | 6.5444E+03 | −3.5121E+04 | 6.6734E+04 |
| R5 | −9.4067E+00 | −4.1194E−02 | 6.0217E−02 | −2.7462E−01 | 1.6378E+00 | −3.8851E+00 | 4.4619E+00 | −1.9172E+00 |
| R6 | −3.0445E−01 | −3.2066E−03 | −1.0813E−01 | 7.2442E−01 | −2.5574E+00 | 5.0877E+00 | −5.1876E+00 | 2.1720E+00 |

Table 16 and Table 17 show design data of inflection points and stationary points of the lenses in the projection lens 30 in an embodiment of the present disclosure.

TABLE 16

| | Quantity of inflection points | Inflection point position 1 | Inflection point position 2 |
|---|---|---|---|
| R1 | 1 | 0.655 | |
| R2 | 2 | 0.405 | 0.745 |
| R3 | 1 | 0.385 | |
| R4 | | | |
| R5 | 1 | 0.635 | |
| R6 | | | |

TABLE 17

| | Quantity of stationary points | Stationary point position 1 |
|---|---|---|
| R1 | | |
| R2 | 1 | 0.585 |
| R3 | | |
| R4 | | |
| R5 | | |
| R6 | | |

Figure 8:
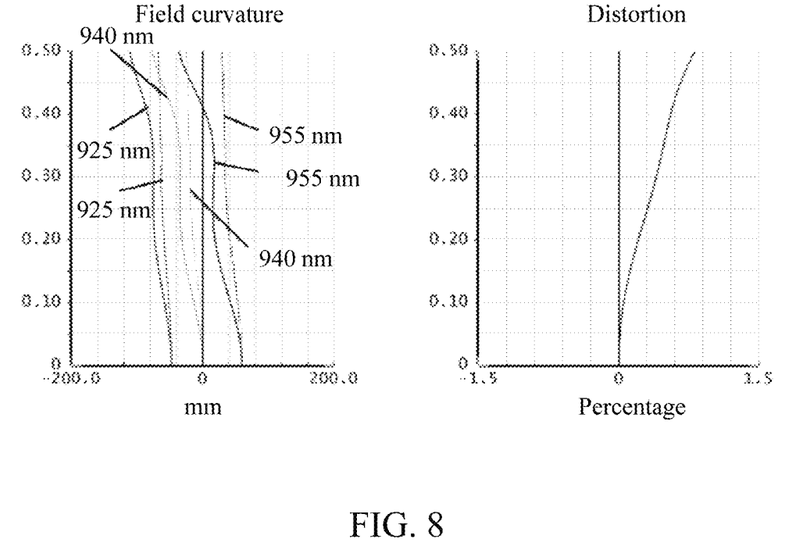
FIG. 8 is a schematic diagram of a field curvature and distortion of the projection lens shown in FIG. 7.

FIG. 8 is a schematic diagram of field curvatures and distortions obtained after light having wavelengths of 925 nm, 940 nm and 955 nm pass through the projection lens 30 in an embodiment.

Figure 9:
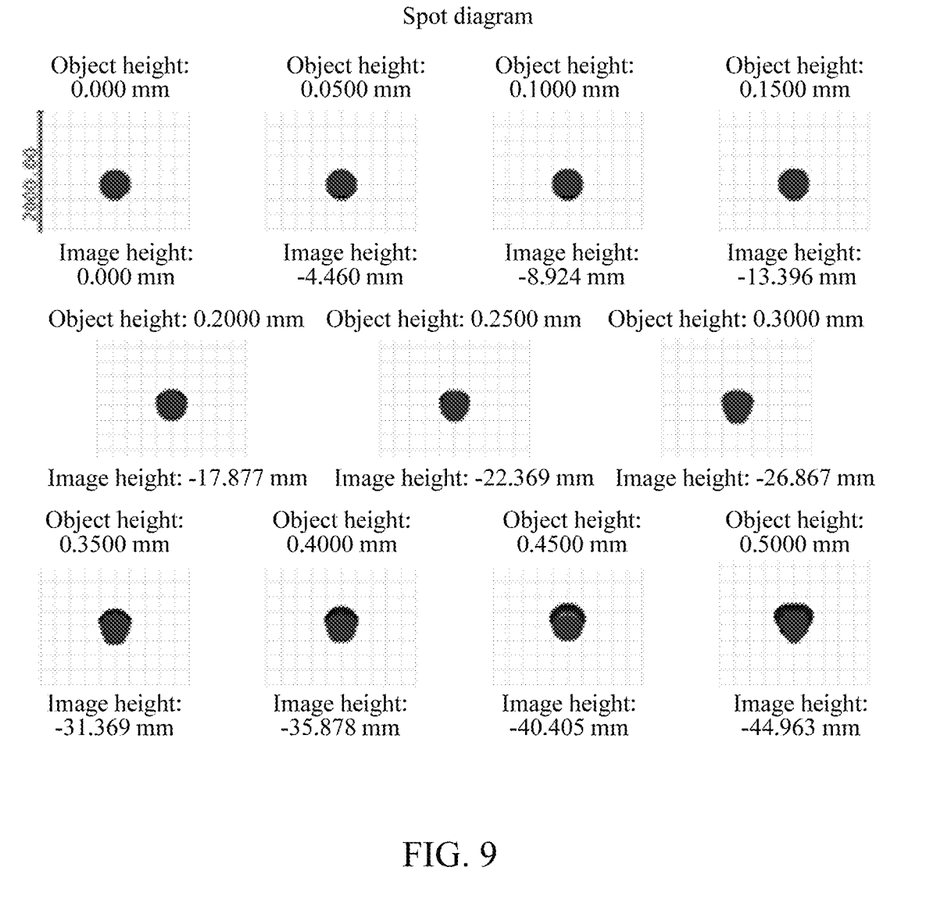
FIG. 9 is a spot diagram of the projection lens shown in FIG. 7.

FIG. 9 is a spot diagram of the projection lens 30 in the embodiment 3.

Table 18 below lists values corresponding to the conditions in the embodiment 3 based on the foregoing conditions. Apparently, the projection lens 30 in the embodiment satisfies the foregoing conditions.

TABLE 18

| Condition | Embodiment 3 |
|---|---|
| $1.7 \leq n2 \leq 2.2$ | 2.005 |
| $1.7 \leq n3 \leq 2.2$ | 2.005 |
| $1.25 \leq f/TTL \leq 2.2$ | 1.29 |
| $-1 \leq (R3 + R4)/(R3 - R4) \leq -0.1$ | −0.84 |
| $0.3 \leq f1/f \leq 0.41$ | 0.41 |
| $-0.2 \leq f2/f \leq 0$ | −0.20 |
| $1.1 \leq d4/d5 \leq 2$ | 1.71 |
| $1.7 \leq (R5 + R6)/(R5 - R6) \leq 2.5$ | 2.42 |

In the embodiment, a full-field image height is 0.5 mm, and a working distance is 399.64 mm.

A person of ordinary skill in the art may understand that the foregoing embodiments are specific embodiments for implementing the present disclosure, and in practical application, various variations may be made to the form and details without departing from the spirit and scope of the present disclosure.

What is claimed is:

1. A projection lens, comprising, in sequence from an object side to an image side: an object surface, a first lens having positive refractive power, a second lens having negative refractive power, and a third lens having positive refractive power, the focal length of the entire projection lens is f, the total optical length of the projection lens is TTL, the refractive index of the second lens is n2, the refractive index of the third lens is n3, the curvature radius of an object-side of the third lens is R5, the curvature radius of an image-side of the third lens is R6, and the following conditions are satisfied:

$1.7 \leq n2 \leq 2.2$;

$1.7 \leq n3 \leq 2.2$; and $1.25 \leq f/TTL \leq 2.20$;

$1.7 \leq (R5+R6)/(R5-R6) \leq 2.5$.

2. The projection lens according to claim 1, wherein the curvature radius of an object-side of the second lens is R3, the curvature radius of an image-side of the second lens is R4, and satisfy the following conditions:

$-1.0 \leq (R3+R4)/(R3-R4) \leq -0.1$.

3. The projection lens according to claim 1, wherein the focal length of the first lens is f1, and satisfy the following conditions:

$0.30 \leq f1/f \leq 0.41$.

4. The projection lens according to claim 1, wherein the focal length of the second lens is f2, and satisfy the following conditions:

$-0.2 \leq f2/f \leq 0$.

5. The projection lens according to claim 1, wherein the on-axis distance from an image-side of the second lens to an object-side of the third lens is d4, the on-axis thickness of the third lens is d5, and satisfy the following conditions:

$1.1 \leq d4/d5 \leq 2.0$.

6. The projection lens according to claim 1, wherein the first lens is made of plastic, the second lens is made of glass, and the third lens is made of glass.

* * * * *